United States Patent [19]

Wingard

[11] Patent Number: 4,912,914

[45] Date of Patent: Apr. 3, 1990

[54] METHOD AND APPARATUS FOR DRYING FORAGE CROPS

[76] Inventor: Steve G. Wingard, 419 Lyndhurst Rd., Columbia, S.C. 29212

[21] Appl. No.: 237,543

[22] Filed: Aug. 29, 1988

[51] Int. Cl.$^4$ .................. A01D 43/00; F26B 23/08
[52] U.S. Cl. .......................... 56/1; 56/10.8; 56/DIG. 23; 34/39; 34/48; 34/113
[58] Field of Search ............ 56/1, 10.8, 12.2, DIG. 1, 56/DIG. 23; 34/110, 113, 124, 39, 48

[56] References Cited

U.S. PATENT DOCUMENTS

| | | | |
|---|---|---|---|
| 1,701,156 | 2/1929 | Heritage | 34/113 |
| 2,465,070 | 3/1949 | Demuth | 56/20 |
| 2,698,170 | 12/1954 | Foley | 263/8 |
| 2,756,554 | 7/1956 | Diehl et al. | 56/1 |
| 2,806,337 | 9/1957 | Rezabek | 56/1 |
| 2,909,881 | 10/1959 | Callahan | 56/12.2 |
| 3,111,398 | 11/1963 | Jones | 34/39 |
| 3,239,652 | 3/1966 | Price | 34/110 |
| 3,257,785 | 6/1966 | Rimes | 56/10 |
| 3,410,065 | 11/1968 | Martin | 56/23 |
| 3,512,765 | 5/1970 | Van Der Lely | 263/34 |
| 3,527,031 | 9/1970 | Winger | 56/1 |
| 3,543,488 | 12/1970 | Kowalik et al. | 56/23 |
| 3,545,734 | 12/1970 | Van Der Lely | 263/37 |
| 3,572,663 | 3/1971 | Van Der Lely | 263/21 |
| 3,585,730 | 6/1971 | Morse | 34/17 |
| 4,021,929 | 5/1977 | Black | 56/12.2 |
| 4,509,273 | 4/1985 | Roisen | 34/86 |
| 4,527,241 | 7/1985 | Sheehan et al. | 56/10.2 |
| 4,812,741 | 3/1989 | Stowell | 56/DIG. 15 |

*Primary Examiner*—Jerome W. Massie
*Assistant Examiner*—Terry Lee Melius
*Attorney, Agent, or Firm*—Michael A. Mann

[57] ABSTRACT

A machine for harvesting and drying a standing forage crop comprising in combination a mower, a plurality of heated rollers for receiving a flow of crop cuttings conveyed from the mower to squeeze substantial excess moisture and evaporate any remaining excess moisture above a predetermined reference moisture range so that the crop cuttings upon issuance from the heated rollers are ready for baling immediately. Moisture detecters positioned preferably before and after the heated rollers signal the moisture content of the crop cuttings to a controller. The controller can vary the temperature of the rollers or vary the residency time of the crop cuttings between the rollers or both. In the preferred embodiment the heated rollers are electrically powered induction rollers and a baler is used in combination with the machine.

13 Claims, 2 Drawing Sheets

METHOD AND APPARATUS FOR DRYING FORAGE CROPS

BACKGROUND OF THE INVENTION

1. Field of the Invention

The present invention relates to methods and apparatus for drying forage crops. More specifically, the present invention is a method and apparatus for cutting, drying and baling standing crops used for forage such as alfalfa and the like.

2. Discussion of Background and Prior Art

Forage crops such as alfalfa are harvested as many as five times in the growing season. The harvested crop has internal and external moisture, generally referred to as natural moisture, and, upon harvesting, may have sufficient excess natural moisture to cause the crop to rot or mold if not removed before the crop is stored. After the crop is mowed, it is left in the field to be sun-cured; that is, left in windows for a few hours or days depending on weather conditions and the natural moisture content of the crop until sufficiently dry for baling. When mowed, the crop stems are crimped to allow internal moisture to escape. While curing in the sun, the crop may be turned and fluffed to dry more evenly.

The loose crop is formed into bales that are typically either small and rectangular in shape or large round discs. It is stored in bales until use as food for livestock.

Rain or moisture from a heavy dew can spoil the windrowed crop or can result in spontaneous combustion if the crop is stored too wet. On the other hand, hot, dry weather can remove too much excess moisture, causing "shattering" as overly dry, brittle leaves and stems crumble during field handling. Therefore, careful timing of harvesting is essential to crop management so that as much of the crop is recovered with adequate but not excess moisture.

Crop management has been especially difficult in the southeast United States because of high temperatures and humidity and the frequency of summer thundershowers. Ideally, during the summer in the southeastern states, alfalfa and other forage crops should be baled as soon as the appropriate moisture content is reached.

Alfalfa is an especially good forage crop because of its high protein content, making it especially good for beef cattle, dairy cattle and horses. However, typically 10 to 15 percent by weight is lost because of repeated handling of the alfalfa for cutting, windrowing, turning and baling. An additional 20 to 30 percent by weight may be lost due to shattering or rain damage or both. Shattering is especially costly to the nutritional value of alfalfa because the leaves, rather than the less nutritive stems, are the first to be lost.

In addition to crop loss, there is also substantial investment in both time and energy made in repeated trips to the field for mowing, windrowing, turning and baling.

To minimize the time that crops lay in the field drying, certain acid preservatives are sometimes sprayed on the crop to allow crops having a higher moisture content to be baled and stored.

In addition to use of preservatives, there are numerous apparatus described in the prior art for drying a forage crop to lower levels of residual moisture, typically by the application of heat to the crop cuttings as they are fluffed and turned in a chamber within the apparatus. Frequently, rollers crimp the cut crop as it is cut to allow internal moisture to escape. Then heat energy is applied by a number of means such as open flames, sun lamps and microwaves.

For example, Van Der Lely, in U.S. Pat. No. 3,512,765, discloses an externally heated drum, positioned with its axis of rotation parallel to the direction of motion of the apparatus, the perimeter of the drum is fitted with an Archimedean screw conveyor to advance the crop. Winger, in U.S. Pat. No. 3,527,031 uses primarily microwaves, assisted by an internally heated roller, to dry crops.

The Van Der Lely invention and Rezabek's U.S. Pat. No. 2,806,554 use temperature sensed by a thermometer as a measure of the heat applied for drying but without measuring dryness directly or using the sensed temperature to control their respective apparatus.

The prior art does not disclose the use of heated rollers to press and evaporate internal and external, excess moisture from a cut forage crop so that it may be baled immediately. The prior art does not disclose the use of moisture detectors to control the temperature of the heated rollers and the speed of the apparatus in cutting the crop.

SUMMARY OF THE INVENTION

It is an object of the present invention to provide for cutting and drying of excess moisture in a forage crop so that the forage crop may be immediately baled.

It is another object of the present invention to provide for a baler to be used in combination with a forage crop mower and dryer.

It is a still further object of the present invention to minimize the field handling of standing forage crops.

It is an object of the present invention to simplify management of forage crops.

It is another object of the present invention to increase the nutritive content of baled forage crops by reducing crop handling, shattering, rotting and molding.

It is another object of the present invention to reduce the amount of energy consumed in the production of cattle and horse feed by reducing the time and energy spent on handling and increasing the nutritive content of the feed produced.

It is a still further object of the present invention to dry a flow of forage crop cuttings between two heated rollers that press external and internal excess moisture from the crop and simultaneously apply heat energy for evaporation of remaining excess moisture.

To achieve the foregoing and other objects and in accordance with the purposes of the invention, as embodied and broadly described herein, the invention involves a machine for cutting and drying a standing forage crop such as alfalfa and the like that contains excess natural moisture that must be removed before the cut crop can be baled.

The machine comprises in combination a mower for cutting the standing forage crop, a first conveyer for feeding a continuous flow of the cut crop to a plurality of heated rollers for squeezing substantial internal and external excess moisture therefrom and simultaneously applying heat energy to evaporate the remaining excess moisture. In the preferred embodiment, a baler for bailing the dried flow of cut crop conveyed from the heated rollers by a second conveyer is used in further combination with the machine. Moisture probes measure the moisture level of the flow of cut crop preferably both upon its being conveyed to and from the heated rollers and signal the measured moisture levels to a controller that adjusts the speed of the machine and first conveyor and the temperature of the rollers, or both, to regulate the final moisture content by increasing or decreasing the time the flow of crop cuttings are between the heated rollers.

Reference is now made in detail to the present preferred embodiment of the invention, an example of which is illustrated in the accompanying drawings.

BRIEF DESCRIPTION OF THE DRAWINGS

The accompanying drawings which are incorporated in and form a part of the specification, illustrate the invention and, together with the description, serve to explain the principles of the invention. In the drawings.

DETAILED DESCRIPTION OF THE INVENTION

The present invention is a machine for cutting and drying a standing forage crop so that it may be baled immediately. In the preferred embodiment, a baler is part of the machine and the machine is self propelled. Alternatively, the machine may be pulled by a tractor and the baler may follow in tandem or follow at a later time.

Figures 1, 3:
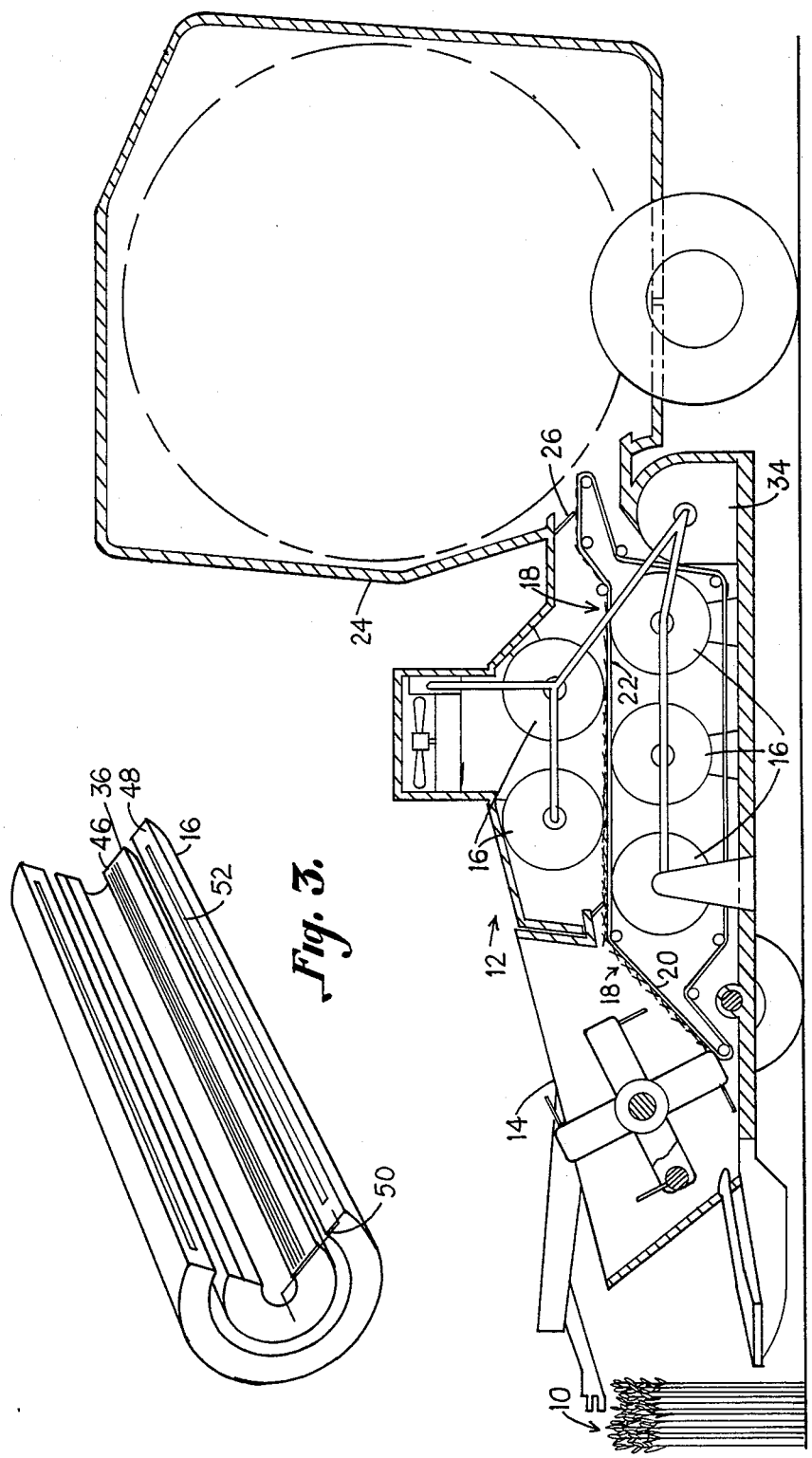
FIG. 1 shows a cross sectional view of the present invention.
FIG. 3 shows a partial cut away view of a heated roller of the present invention.

Referring to FIG. 1, the standing forage crop 10 is of the type requiring reduction of natural moisture carried by the crop, both internal and external moisture such as results from rain or dew, from some level of excess moisture to a level of residual moisture suitable for baling.

The natural moisture level is the total moisture content of the crop at harvest, or the time of cutting, and the excess moisture is the amount of moisture that must be shed so that molding and rotting do not occur. The level of residual moisture is the amount of moisture remaining after shedding of excess moisture so that shattering and spontaneous combustion does not occur. The residual moisture and the excess moisture together equal the natural moisture at harvest.

The machine 12, in a preferred embodiment, comprises a conventional mower 14, without windrowing attachments, in combination with a plurality of heated rollers 16, preferably induction heated rollers. As machine 12 proceeds in one direction at a speed appropriate for mower 14 to cut standing crop 10 in the field. Standing crop 10 is cut by mower 14 and conveyed in a flow of crop cuttings 18 to heated rollers 16 by a suitable first conveyor 20.

The rollers 16 may be arranged in sets of two, one above the other, or on a triangular pitch or in some other arrangement so long as they are of sufficient size and heat energy applying capacity to squeeze internal and external excess moisture carried by cuttings 18, apply heat energy to remove any remaining excess moisture, and convey flow of crop cuttings 18 therebetween.

By squeezing flow of crop cuttings 18 instead of crimping, substantial external and internal excess moisture is shed immediately and the flow of crop tends to form a mat that can be baled with reduced handling losses. The crop stems tend to fracture longitudinally rather than break horizontally. Applying heat removes the remaining excess moisture and helps to control bacteria on the crop.

A second conveyor 22 conveys flow of crop cuttings 18 to a baler 24. Baler 24 can be the type that forms a large disc bale or a square bale. The former type of baler is shown in FIG. 1.

Moisture probes 26 are place in the path of flow of crop cuttings 18 to sense the level of moisture. Probes 26 may be placed in the path of the flow before heated rollers 16 or after or both, with probes 26 both before and after being preferred. Also, more than one probe on either side of heated rollers 16 improves the accuracy of the moisture measurements.

Figure 2:
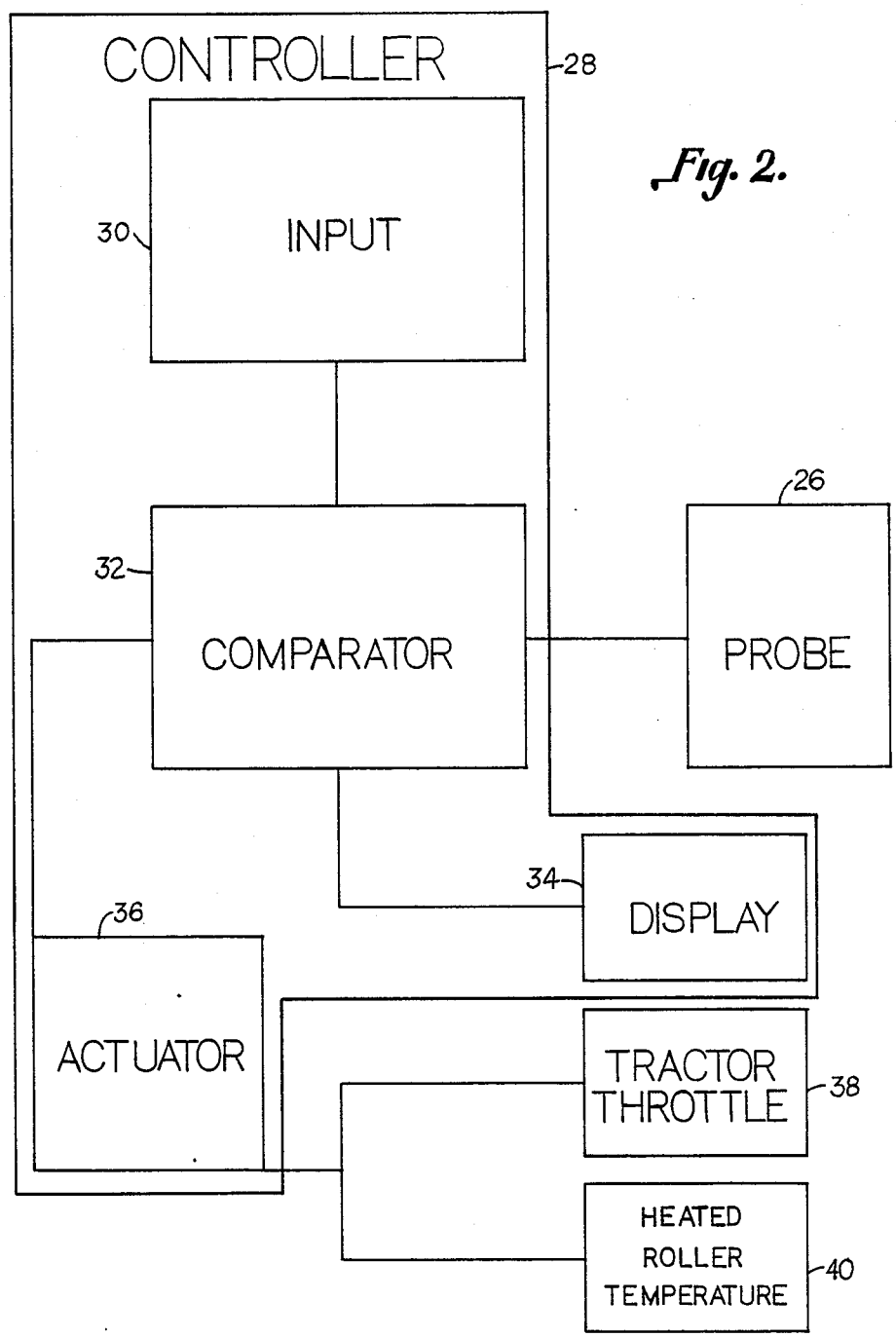
FIG. 2 shows a schematic diagram of the control system of the present invention.

Referring to FIG. 2, the level of the moisture measured by probe 26 is converted to a signal, preferably electrical, and sent to a controller 28. Controller 28 has an input 30, a comparator 32, a display 34 and an actuator 36. Controller 28 receives the signal, comparator 32 compares it to a reference moisture level in input 30, preferably a reference moisture range between a minimum level and a maximum level. Preferably both reference and signal moisture levels are displayed by display 34. If the moisture level is outside the moisture range, the controller automatically adjusts the amount of heat energy being applied to flow of crop cuttings 18.

In the preferred embodiment, two signals are sent simultaneously by actuator 36 of controller 26 to actuate an adjusting in the heat to be applied. One signal is sent to the throttle 38 governing the speed of mower 14 and the first conveyor 20; the other, to temperature control 40 of heated rollers 16. Throttle 38 responds immediately to change the speed of mower 14 and first conveyor 20: a slower speed increases applied heat energy because it increases the residency time flow of crop cuttings 18 is between rollers 16; an increase in the tractor speed decreases the residency time. As the temperature of rollers 16 responds to the signal from the controller 28, the throttle speed is adjusted in the direction opposite the initial direction signalled by controller 28 so that the cutting speed can resume.

If machine 12 is not used in combination with a baler 24, the windrow attachments for conventional mower 14 may be used to align flow of crop cuttings 18, dried for baling by heated rollers 16, and left in windrows for baling as soon thereafter as desired.

Rollers 16 in the preferred embodiment are induction coil jacket rollers. Induction coil jacket rollers are especially efficient users of energy and respond quickly and accurately to control signals.

The jacket rollers apply an alternating current from a generator 42 carried by machine 12, or from the alternator of the tractor engine, in a commercial frequency to an induction coil 44 about a magnetic core 46, as seen in FIG. 3. The changing magnetic field of core 46 induces an electric current in a shell 48 of roller 16. The electric current heats shell 48 by joule heating.

Jacket rollers 16 may have heat sensors 50 and a working fluid in a cavity 52 within the shell that alternately evaporates and condenses to help distribute the heat.

Other sources of heat from the interior of rollers 16, such as steam, may work sufficiently well. However, jacket rollers are preferred especially because they can change temperature quickly enough that machine speed may not have to be adjusted to accommodate variations in crop moisture from one part of the field to another The foregoing description of preferred embodiment of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments with various modifications as are suited to the particular use contemplated. It is intended that the scope of the invention be defined by the claims appended hereto.

I claim:

1. A machine for harvesting a standing crop and removing excess moisture carried by said crop above a desired range of residual moisture so that said crop resists rotting, molding, shatterinng and spontaneous combustion while stored in bales, said machine comprising:
   a means for cutting said standing crop as said machine moves at a speed in a first direction so that a continuous flow of cuttings issues from said cutting means in a direction opposite said first direction;
   a plurality of induction jacket rollers between which induction jacket rollers said flow of cuttings passes;
   said plurality of induction jacket rollers squeezing said flow of cuttings so that some of said excess moisture is squeezed therefrom;
   said plurality of induction jacket rollers heated to a temperature for evaporating any remaining excess moisture in said flow of cuttings above said desired level of residual moisture as said flow of cuttings passes between said rollers so that substantially all of said excess moisture is removed and said flow of cuttings may be baled immediately upon issuing therefrom;
   a first conveying means for conveying said flow of cuttings from said cutting means to said plurality of heated induction jacket rollers;
   a means for detecting said level of excess moisture carried by said flow of cuttings and generating a signal corresponding to said level; and
   a controlling means for receiving said signal, comparing said signal to a reference, determining a difference between said signal and said reference, and adjusting said level of moisture in said flow of cuttings conveyed from said induction jacket rollers so that said difference is reduced;
   said controlling means adjusting said level of moisture in said flow of cuttings by commanding a change in said heat energy applied to said flow of cuttings by said plurality of induction jacket rollers.

2. The machine of claim 1 wherein said change in said heat energy is obtained by adjusting said speed of said first connveying means.

3. The machine of claim 1 wherein said change in said heat energy is obtained by adjusting said temperature of said plurality of said induction jacket rollers.

4. The machine of claim 1 wherein said change in said heat energy is obtained by varying said speed and said temperature according to an algorithm so that said difference is reduced quickly by first varying said speed and then by varying said temperature so that said machine can return to said speed as said temperature varies.

5. The machine of claim 1 wherein said detecting means comprises at least one moisture probe positioned so that said excess moisture level in said flow of cuttings can be detected.

6. The machine of claim 5 wherein said at least one probe is positioned so that said excess moisture level can be detected before said flow of cuttings enters said plurality of induction jacket rollers.

7. The machine of claim 5 wherein said at least one porbe is positioned so that said excess moisture level can be detected after said flow of cuttings leaves said plurality of induction jacket rollers.

8. The machine of claim 1 further comprising
   a bailing means for forming said flow of cuttings into bales and periodically dispensing said bales from said baling means; and
   a second conveying means for conveying said flow of cuttings from said plurality of induction jacket rollers to said baling means.

9. A process for harvesting a standing crop that requires removal of excess moisture carried by said crop above a desired level of residual moisture so that said crop resists rotting, molding, shattering and spontaneous combustion while stored in bales, said process comprising the steps of
   cutting said standing crop;
   heating a plurality of induction jacket rollers to a first temperature;
   conveying said cut crop through said plurality of heated induction jacket rollers at a first speed; and
   squeezing said cut crop between said plurality of heated induction jacket rollers so that at least some excess moisture is removed by pressure of said plurality of heated induction jacket rollers;
   evaporating any remaining excess moisture by applying a level of heat energy from said plurality of heated induction rollers to said cut crop;
   determining a level of excess moisture in said cut crop;
   comparing said level of excess moisture to a reference level of moisture to determine a difference; and
   adjusting said level of heat energy so that said difference is reduced.

10. The process of claim 9 wherein said level of heat energy is adjusted by changing said first temperature.

11. The process of claim 9 wherein said level of heat energy is adjusted by changing said first speed.

12. The process of claim 9 wherein said level of heat energy is changed by the steps of
    changing said first speed;
    changing said first temperature; and
    resuming said first speed as said first temperature is changed.

13. The process of claim 9 further comprising the step of baling said squeezed cut crop.

* * * * *